Nov. 15, 1966     J. RITTER ETAL     3,286,072
WIRE MESH DOUBLE SPOT WELDING
Filed Feb. 7, 1964     3 Sheets-Sheet 1
PRIOR ART
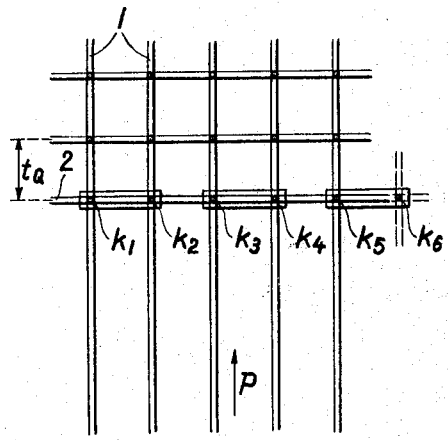
Fig.1
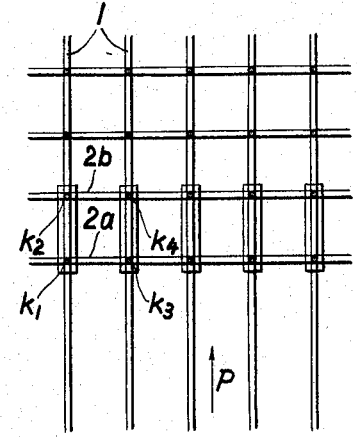
Fig.2
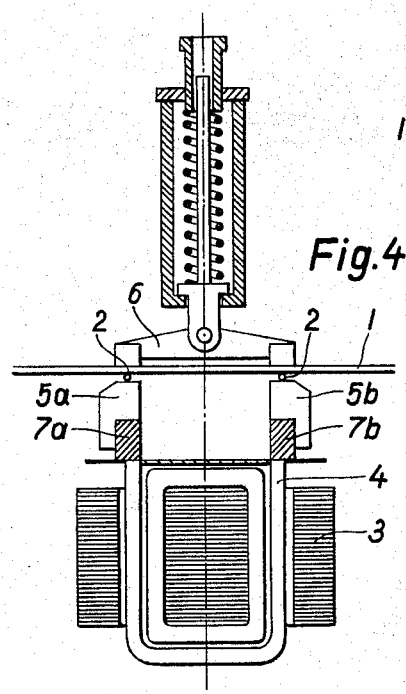
Fig.3
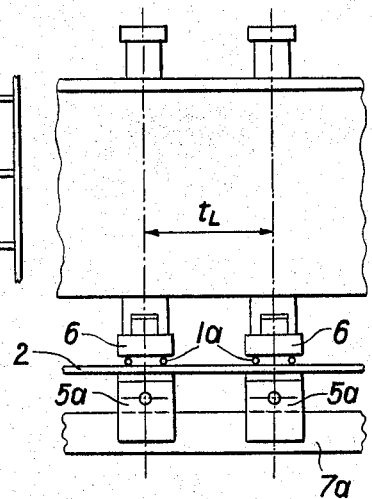
Fig.4a
Fig.4
INVENTORS:
Josef Ritter and Hans Gött,
BY   Erwin P. Marmorek,
THEIR ATTORNEY.

Nov. 15, 1966    J. RITTER ETAL    3,286,072
WIRE MESH DOUBLE SPOT WELDING

Filed Feb. 7, 1964    3 Sheets-Sheet 2

INVENTORS
Josef Ritter and Hans Gött,

BY *Edward D. Marmorek,*

THEIR ATTORNEY.

3,286,072
WIRE MESH DOUBLE SPOT WELDING
Josef Ritter, Graz-Kroisbach, Styria, and Hans Gött, Graz, Styria, Austria, assignors to AVI Alpenlandische Veredelungs-Industrie Gesellschaft m.b.H., Graz, Styria, Austria
Filed Feb. 7, 1964, Ser. No. 343,333
3 Claims. (Cl. 219—56)

In conventional mesh welding machines operating by the double spot welding method, wherein the electrodes are disposed below, and passive current bridges are disposed above, the groups of wires, the longitudinal wires are unwound from reels and are fed to the welding machine in parallel relationship to one another so that they will rest on the electrodes, while the transverse wires are fed individually at right angles to the longitudinal wires and are placed above the longitudinal wires and thereafter the passive bridges are applied from above, and the transverse wires are then welded to the longitudinal wires at the points of intersection. The double spot weld zones in such cases are situated in the direction of the transverse wires so that each double spot weld zone extends across two points of intersection of one transverse wire and two adjacent longitudinal wires.

The particular disadvantage of machines of this kind is that when there is an odd number of longitudinal wires, there is one surplus point of intersection between the transverse wire and a longitudinal wire, and this point of intersection cannot be incorporated in the double spot weld zone, so that special steps have to be applied, for example the series circuiting of a power-consuming resistance that simulates a weld spot in the welding circuit, to ensure the same welding current and hence the same welding quality for this individual spot as for the other double spot welds.

The instant invention relates to a method of producing welded mesh, which also operates by the double spot welding method but which obviates the said disadvantages and also has the advantage that production can be doubled for the same structural size and speed of operation of the welding machine.

The instant invention accordingly has among its principle objects to provide method and means for obviating the drawbacks of the prior art.

It is a further object of the instant invention to provide a machine, and methods for producing double spot welded wire mesh at increased speed and hence at great savings.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

The instant invention broadly comprises that the double spot weld zone is positioned in the direction of the longitudinal wires, that the transverse wires are disposed on that side of the mesh that faces the electrodes while the longitudinal wires are disposed on that side of the wire mesh that faces the passive current bridge, and that each longitudinal wire is spot welded simultaneously across a double weld spot zone.

In this welding process, as stated, the double spot weld zones are situated in the direction of the longitudinal wires; and during the double spot welding simultaneously two transverse wires are welded on to each longitudinal wire; thereby an even number of weld spots is always obtained, even for an odd number of longitudinal wires, so that there is no individual point left over requiring the artificial production of the same welding current as in the double spot weld zones. With this welding process two transverse wires are welded during a full working cycle—comprising the transverse wire feed, preparation of the welding circuit by application of the conventional passive double spot welding current bridges opposite the two electrodes of each double spot weld zone, switching of the welding current on and off, removal of the current bridges and finally the longitudinal wire feed by two transverse wire pitches. Thereby twice the production is obtained as against conventional welding machines for the same sequence of individual operations, without the welding machine dimensions being enlarged.

In order to prevent the occurrence of at least a partial shunting by the longitudinal wires of the electrodes which are assigned to each double spot weld zone and which are off-set relative to each other in the direction of the longitudinal wires, the instant invention provides as follows, which has previously been referred to briefly: The transverse wires are arranged on that side of the wire mesh to be produced which faces the electrodes, and conversely, the longitudinal wires on that side which faces the passive current bridges. This means that the assignment of longitudinal and transverse wires is reversed as compared to machines now in use which place the double spot weld zones in the direction of the transverse wires.

In the method according to the invention, two transverse wires are advantageously fed simultaneously, the intermittent longitudinal wire feed being carried out by an amount equal to twice the transverse wire spacing of the mesh. Alternatively, the transverse wires can be fed consecutively by a single transverse wire feed system, and to this end the intermittent longitudinal wire feed can be carried out twice by an amount equal in each case to just one transverse wire spacing, in which case, of course, the welding operation is performed only after every second feed step of the longitudinal wires.

A double spot welding machine according to the invention for performing the method described, wherein the longitudinal and transverse wire feed is carried out conventionally in two directions at right angles to one another, broadly provides that the electrodes associated with each double spot weld zone are disposed consecutively in the direction of feed of the longitudinal wires and the associated current bridges are accordingly also disposed in the direction of feed of the longitudinal wires.

The feed plane of the transverse wires is disposed closer to the electrodes than the feed plane of the longitudinal wires. As will be explained in greater detail hereinafter, a machine of this kind can be constructed for the production of mesh of varying mesh widths, the gap in the longitudinal wire direction between the two electrodes of each pair forming a double spot weld zone and/or the mutual distances between these pairs of electrodes and between the associated current bridges being variable.

For a fuller understanding of the nature and objects of the invention, reference should be had to the following detailed description, taken in connection with the accompanying drawings, in which:

FIG. 1 is a schematic plan view illustrating a conventional double spot welding process for mesh;

FIG. 2 is a schematic plan view, similar to FIG. 1, but illustrating a double spot welding process in accordance with the instant invention;

FIG. 3 is a large scale sectional view of a double spot weld zone machine, taken along the axis of a longitudinal wire;

FIG. 4 is a fragmentary elevational view of the welding machine of FIG. 3 seen in the direction P of FIG. 2;

FIG. 4a is a plan view of a ladder-shaped reinforcement lattice structure known under the trademark "bi-Stahl";

Figure 5:
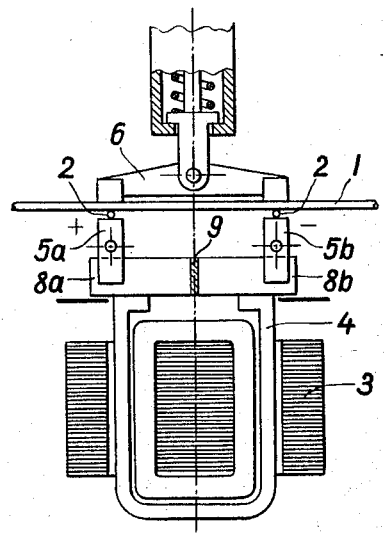
FIG. 5 is a sectional view, similar to FIG. 3, but embodying a modification in which the electrodes are adjustable relative to each other, showing the electrodes at a large distance from each other.

With reference to FIG. 1 in explanation of the operation of known mesh welding machines with double spot welding, parallel longitudinal wires 1 are intermittently fed in the direction of the arrow P by an amount corresponding to one transverse wire spacing $t_Q$. The transverse wires 2 are placed individually on the longitudinal wires 1 and are welded to the latter at the points of intersection $k_1$, $k_2$, and so forth, by the double spot welding method, the double spot weld zones $k_1$–$k_2$, $k_3$–$k_4$, and so forth, being situated in the direction of each transverse wire 2. If there is an odd number of longitudinal wires, one point of intersection (in FIG. 1 the point $k_5$) will be left over, because there is not a paired point of intersection $k_6$ for the same for inclusion in a double spot weld zone. In order therefore to ensure the same current at the point of intersection $k_5$ as at the other points of intersection, the missing point of intersection $k_6$ must be artificially simulated by additional means, and this entails extra work in setting up the machine, as well as a power loss in operation.

In the method according to the invention shown in principle in FIG. 2, two transverse wires 2a and 2b are each simultaneously welded to the longitudinal wires 1, the double spot weld zones $k_1$–$k_2$ and $k_3$–$k_4$, respectively, extending in the direction of the longitudinal wires and points of intersection of both transverse wires being included in each double spot weld zone, so that for each welding operation there is automatically an even number of points of intersection with no single point of intersection left over irrespective of whether the number of longitudinal wires is odd or even. Two transverse wires are simultaneously connected to the longitudinal wires by each welding operation so that production is doubled for the same sequence of working operations.

FIG. 3 shows a single double spot weld zone of a welding machine constructed according to the invention, viewed in the direction of the transverse wires 2 which are situated below the longitudinal wires 1, so that the electrodes 5a, 5b and the welding transformers 3 can be disposed beneath the two groups of wires and only the passive conventional current bridges 6 are disposed above the groups of wires. The weld zones can be supervised more satisfactorily with this type of construction.

According to FIG. 3, the secondary winding 4 of the transformer 3 is connected to two bus bars 7a and 7b which extend in the transverse direction of the machine and on which the welding electrodes 5a and 5b are transversely slidable and lockable so that the distance between the pairs of electrodes of the various double spot weld zones can be adapted to the longitudinal wire spacing $t_L$ (compare FIG. 4).

In FIG. 4 it has been assumed that the welding machine is to be used, for example, for the production of a reinforcement mesh for building purposes, the longitudinal wires of which consist of ladder-like reinforcing elements which are commercially available under the trade name "bi-Stahl" and which are denoted by reference 1a in FIG. 4 and are shown in elevation in FIG. 4a. If the electrodes 5a, 5b and the current bridges 6 are made appropriately wide, the two longitudinal wires of the reinforcing element 1a can be engaged between one electrode and a current bridge so as to form two parallel weld current paths at one electrode 5a, which are connected in series with another two parallel weld current paths at the other electrode 5b in accordance with the double spot welding method.

Figure 6:
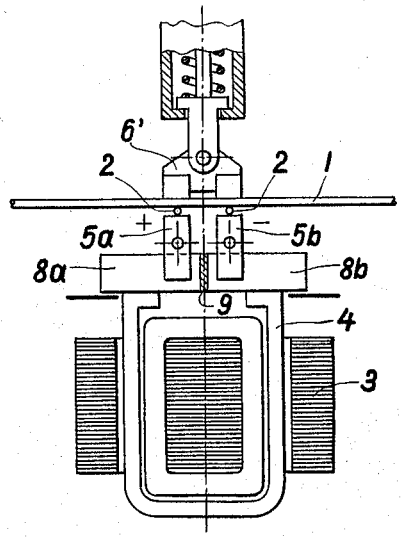
FIG. 6 is a sectional view similar to FIG. 5, but showing the electrodes pushed close together, and a short current bridge assigned thereto.

In the exemplified embodiment shown in FIG. 5, the electrodes 5a, 5b are slidable and lockable on bus bars 8a and 8b connected to the terminals of the secondary winding 4 of the welding transformer 3 and extending in the direction of the longitudinal wires. The distance between the electrodes of each pair thereof can thus be adjusted according to the transverse wire spacing $t_Q$, only the current bridge 6 having to be changed for one of appropriate length. FIG. 5 shows an adjustment to a relatively large transverse wire spacing, FIG. 6 for a relatively small transverse wire spacing, the electrodes 5a, 5b being close together and a short current bridge 6' being used. The two bus bars 8a, 8b are almost in abutment contact and are separated only by a thin insulating shim 9, so that it is possible to obtain an adjustment to a very small transverse wire spacing.

Figure 7:
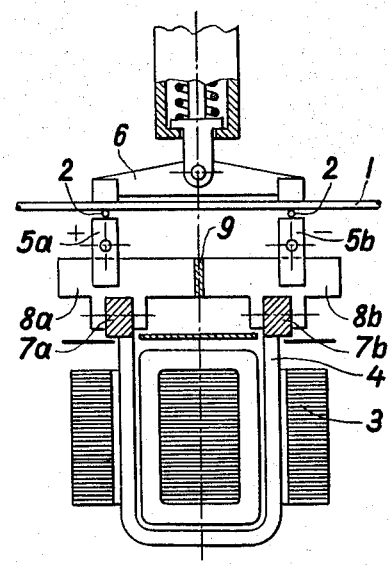
FIG. 7 is a sectional view similar to FIGS. 3 and 5, but showing a further modified embodiment.

In the exemplified embodiment according to FIG. 7, the adjustment facilities afforded by the construction according to FIGS. 4 and 5 are combined, that means the electrodes 5a, 5b are slidable on bus bars 8a and 8b in the direction of the longitudinal wires 1 and these bus bars are in turn slidable and lockable in the direction of the transverse wires on bus bars 7a, 7b, so that each electrode is adjustable, by means of this arrangement after the style of a compound slide rest, in the longitudinal and transverse directions for a required longitudinal and transverse wire spacing.

Figure 8:
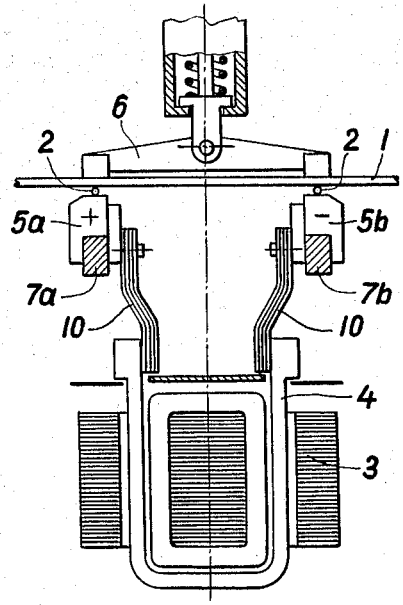
FIG. 8 is a sectional view similar to FIG. 7, embodying a further modification.

The exemplified embodiment according to FIG. 8 offers similar adjustment facilities, although in this case only two bus bars 7a, 7b are provided, which extend transversely of the longitudinal wires and which are connected by flexible leads 10 to the secondary winding 4 of the transformer 3. The electrodes of the various double spot weld zones can be adjusted to any required transverse wire spacing by variation of the distance between said bus bars 7a, 7b. The electrodes 5a, 5b can again be adjusted to the required longitudinal wire spacing in the direction of the transverse wires and be locked on the bars 7a, 7b. Such welding electrodes adjustable and lockable on bus bars are known in various forms.

In the exemplified embodiment according to FIG. 8, the flexible leads 10 may be dispensed with if sliding contact surfaces of appropriate size are provided between the bus bars 7a, 7b and the ends of the secondary winding 4, the bus bars then being fixed on the contact surfaces at the required distances.

Figure 9:
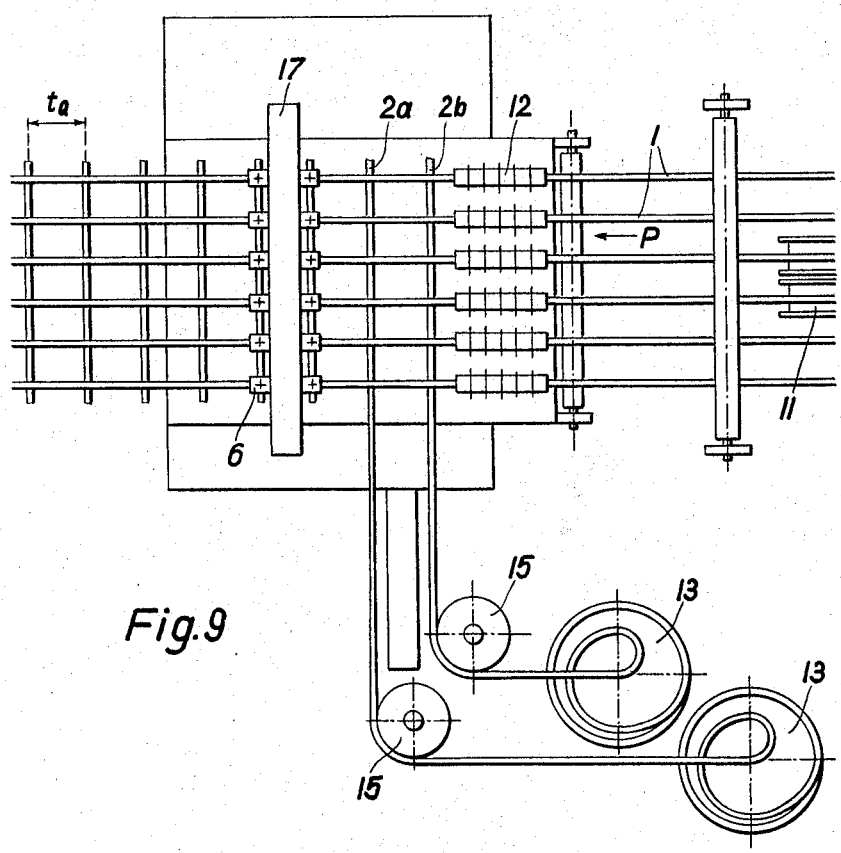
FIG. 9 is a schematic plan view of a machine in accordance with the invention.

In the welding machine shown in FIG. 9, the longitudinal wires 1 unwinding from reels 11 are intermittently fed by known means in the direction of the arrow P by an amount equal to twice the transverse wire pitch $t_Q$, straightener means 12 (shown only diagrammatically) advantageously being incorporated in the longitudinal wire feed. Two reels 13 and two guide rolls 15 are provided for the transverse wire feed. The transverse wires 2a, 2b are fed simultaneously in pairs after each advance of the longitudinal wires 1 and on the next advance of the latter they reach the welding station 17, of which FIG. 9 shows only the current bridges 6 disposed in the feed direction of the wires. The welded mesh is obtained after the weld zones. During the welding operation the next two transverse wires 2a, 2b are already being fed into the machine.

The exemplified embodiments described naturally permit certain modifications within the scope of the invention. For example, the arrangements of longitudinal and transverse wires and the welding transformers or current bridges can be changed over so that the transformers are situated above the groups of wires if this is desirable for some reason.

We wish it to be understood that we do not desire to be limited to the exact details of construction shown and described, for obvious modifications will occur to a person skilled in the art.

Having thus described the invention, what we claim as new and desire to be secured by Letters Patent is as follows:

1. In a welding machine, for use in producing welded mesh by double spot welding, comprising in combination, means operable for feeding into the machine longitudinal wires in a longitudinal direction and transverse wires at an angle thereto, said machine including for each double spot weld zone two electrodes arranged in the feed direction of the corresponding longitudinal wire and forming a pair and a passive current bridge also arranged in said longitudinal feed direction disposed opposite said pair of electrodes and cooperating therewith, said pair of electrodes and bridge being operable to receive therebetween said longitudinal wire and two transverse wires in superposition, the plane of the transverse wires being closer to said electrodes than the plane of the longitudinal wires, each pair of electrodes forming with the wires disposed therebetween an electric series connection, two bus bars disposed at right angles to said longitudinal wire feed direction, and two secondary bus bars each movably mounted on a cross bar and extending in said longitudinal direction and adjustably mounting said electrodes, whereby said electrodes may be moved in said longitudinal direction as well as at right angle thereto.

2. A welding machine according to claim 1, characterized in that the front and rear electrodes of all the pairs thereof forming a double spot weld zone are slidable and lockable on the two bus bars extending at right angle to the direction of feed of the longitudinal wires.

3. In a welding machine, for use in producing welded mesh by double spot welding, comprising in combination, means operable for feeding into the machine longitudinal wires in a longitudinal direction and transverse wires at an angle thereto, said machine including for each double spot weld zone two electrodes arranged in the feed direction of the corresponding longitudinal wire and forming a pair and a passive current bridge also arranged in said longitudinal feed direction disposed opposite said pair of electrodes and cooperating therewith, said pair of electrodes and bridge being operable to receive therebetween said longitudinal wire and two transverse wires in superposition, the plane of the transverse wires being closer to said electrodes than the plane of the longitudinal wires, each pair of electrodes forming with the wires disposed therebetween an electric series connection, characterized in that two parallel and simultaneously operable transverse wire feed systems are provided.

References Cited by the Examiner

UNITED STATES PATENTS

| | | | |
|---|---|---|---|
| 649,179 | 5/1900 | Reitzel | 219—116 |
| 795,541 | 7/1905 | Perry | 219—56 |
| 981,662 | 1/1911 | Lachman | 219—148 |
| 1,448,566 | 3/1923 | Muller et al. | 219—56 X |
| 2,473,859 | 6/1949 | Butler | 219—56 |
| 2,588,062 | 4/1962 | Vorderstrasse | 219—56 |
| 3,188,444 | 6/1965 | Ramstein | 219—56 |

OTHER REFERENCES 1,050,939, February 1959, German printed application.

RICHARD M. WOOD, *Primary Examiner.*

B. A. STEIN, *Assistant Examiner.*